United States Patent [19]

Link et al.

[11] Patent Number: 4,608,747
[45] Date of Patent: Sep. 2, 1986

[54] MULTISPINDLE-AUTOMATIC TURRET LATHE

[75] Inventors: Helmut F. Link, Aichwald; Dietmar F. Hafla, Hohengehren, both of Fed. Rep. of Germany

[73] Assignee: Index-Werke Komm.-Ges. Hahn & Tessky, Esslingen, Fed. Rep. of Germany

[21] Appl. No.: 488,785

[22] Filed: Apr. 26, 1983

[30] Foreign Application Priority Data

May 6, 1982 [DE] Fed. Rep. of Germany ....... 3216892

[51] Int. Cl.$^4$ ............................................ B23Q 3/157
[52] U.S. Cl. ........................................ 29/568; 82/2.7; 408/13; 409/218
[58] Field of Search ...................... 29/568, 38 A, 38 B, 29/38 C, 38 R, 39, 40, 41, 42, 43, 44, 46, 45.5 R, 45.5 A, 47, 49, 50, 51, 52, 53, 54, 55, 56, 57, 27 L, 27 R, 37 R; 82/2.5, 3, 2.7, 2.5, 3; 408/35, 33, 71, 11, 13; 414/736, 744 R, 744 A; 409/218

[56] References Cited

U.S. PATENT DOCUMENTS

| 3,576,144 | 4/1971 | Strah | 82/2.5 |
| 3,587,360 | 6/1971 | Oxenham | 29/568 X |
| 3,587,630 | 6/1971 | Reiners et al. | 82/2.5 |
| 3,792,633 | 2/1974 | Filipiev et al. | 82/2.5 |
| 3,821,835 | 7/1974 | St. Andre et al. | 82/2.7 X |
| 3,990,133 | 11/1976 | Schalles et al. | 82/2.5 X |
| 4,008,633 | 2/1977 | Gilbert et al. | 82/3 |
| 4,019,410 | 4/1977 | Staszkiewicz | 82/3 X |
| 4,208,772 | 6/1980 | Earnhardt et al. | 82/2.5 X |
| 4,214,191 | 7/1980 | Watanabe et al. | 29/568 X |
| 4,297,925 | 11/1981 | Ishizuka et al. | 82/2 R X |
| 4,312,105 | 1/1982 | Brown | 29/568 |
| 4,404,727 | 9/1983 | Zankl | 82/2.5 X |

Primary Examiner—Gil Weidenfeld
Assistant Examiner—Glenn L. Webb
Attorney, Agent, or Firm—Shenier & O'Connor

[57] ABSTRACT

Multispindle-automatic turret lathe comprising a spindle support which is rotatable about a central switching or indexing axis and in which are rotatably mounted a number of work spindles each defining one switching or indexing station of the spindle support.

In order to enable the tools which are fitted on the turret being precisely measured in that position thereof in which the tools are required to work a measuring station is provided on the spindle support in like geometrical relation to the indexing axis as the workspindles, said measuring station defining a further switching or indexing station of the spindle support.

In order also to enable a tool change being executed with the aid of the manipulating means which are provided for changing the workpieces or to enable tools being transferred directly from the spindle support to the turret and vice versa the spindle support is further provided with a tool-gripper station arranged in like geometrical relation to the indexing axis as the workspindles and defining a further indexing station of the spindle support.

11 Claims, 17 Drawing Figures

MULTISPINDLE-AUTOMATIC TURRET LATHE

The invention relates to a multispindle-automatic turret lathe of the kind comprising a spindle support which is rotatable about a central indexing axis and in which are rotatably mounted a plurality of workspindles each defining an indexing station and each having the same angular position and radial spacing relative to the indexing axis.

In a known multispindle automatic turret lathe comprising the aforementioned provisions the axes of the workspindles extend tangentially to an imagined cylinder coaxial with the indexing axis of the spindle support, each of said axes including an acute angle with the generatrices of such a cylinder. If the spindle support is provided with two workspindles their axes may define an angle of 90° as viewed fron one side vertically of the indexing axis in order to enable working with the horizontally orientated spindle whilst the vertically upwardly extending workspindle is being unloaded, or loaded with a new workpiece (German AS No. 23 38 207 and "Drehmaschine DZ 300 CNC" by J. G. Weisser Söhne, 7742 St.Georgen.)

It is the underlying aim of the invention, in multispindle automatic turret lathes of the kind specified, to simplify the operations associated with a tool change. According to the invention this can be achieved by the provision of at least one further indexing station designed to function as a measuring station or as a tool-gripper station on the spindle support said further station or stations being arranged on the spindle support in like geometrical position relative to the indexing axis as the workspindles. In other words, with a machine according to the invention such a measuring- and/or tool gripper station may be brought exactly into the working position of the workspindles by rotating the spindle support about its indexing axis. A measuring station which can be moved into the position of the workspindle in operation enables the tools which are carried on the turret to be measured precisely in the position in which they are required to work so that, particularly with CNC-machines (numerically controlled machines) a very high degree of precision can be achieved with extraordinary ease and simplicity and, if a tool gripper can be put into the place of the workspindles the tool change may also be effected with the aid of the manipulating means which are provided for work-piece changes or by direct transfer from spindle support into the turret and vice versa without there being any need for further outlay and costs.

In the aforementioned known multispindle automatic turret lathes in which the workspindle axes extend tangentially relative to an imagined cylinder around the spindle-support indexing axis, or parallel with the latter (German AS No. 23 38 207 and, e.g. German AS No. 21 59 552) any increase in the temperature of the machine in the region of the spindle support will entail a drifting-apart movement of the workspindle axes and this detracts from the precision of lathe performance. In a preferred embodiment of the invention it is recommended to arrange the axes of the workspindles in such a way that they intersect the spindle support indexing axis.

Corresponding considerations will then apply in respect of the disposition of the axis of the measuring- and/or tool-gripping station, thus resulting in a thermosymmetrical construction of the spindle-support.

If that work spindle which occupies the working position at any given time is in a horizontal position—as is customary—it is advisable to fix the included angle between workspindle axes and spindle support-indexing axis at 45°, because then the angle between two work spindle axes will be 90°, if these axes are contained in a plane passing through the spindle-support indexing axis. Such an arrangement has the advantage that the other workspindle which is not actually working extends vertically upwards and can therefore be particularly easily fitted with a workpiece—the latter being simply dropped into the open chuck whereupon it engages of its own accord with the appropriate endstop in the chuck. Similar considerations apply, for example, in respect of a tool-gripping station assuming that—in accordance with this invention—the said station is arranged positionally on the same principles as the workspindles.

A measuring station, or several such measuring stations, in the spindle support will preferably be provided with a sensor or tracer element to measure tools fitted in the turret head and/or with a calibrated scale for a tracer or sensor carried on the turret. Such sensor pick-ups are known; they issue an electrical signal on making contact with a workpiece or with a toolbit so that with their aid it is possible to measure the position of a cutting edge on a toolbit relative to a work spindle which is to be adjusted in the correct workposition and to feed these data into the machine programme control unit; on the other hand, with the aid of a calibrated scale on a measuring station it is possible to calibrate a sensor on the turret in order to use it for subsequently measuring a fresh- or a finished workpiece engaged in one of the workspindles.

Conveniently the gripper station will be equipped with several grippers thus allowing a fresh tool for the turret to be introduced into one gripper whilst the other gripper can take up a used tool which is to be taken off the turret.

Further provisions, advantages and details of the invention arise from the attached claims and/or from the following specific description and accompanying drawings of some preferred embodiments of the invention in which:

First of all the basic construction of a multispindle automatic turret lathe according to this invention will be explained in principle with reference to FIGS. 1 and 2.

A spindle support 12 is mounted on a headstock 10 for rotation about an indexing or switching axis 14 which latter extends preferably at an angle of 45° relative to the horizontal. This spindle support has two work spindles 16,18, a measuring station 20 and a gripper station 22, the axes of the two work spindles 16 and 18 including between them an angle of 90° and respectively including an angle of 45° with the switching axis 14 and intersecting the switching axis and eachother at one and the same point.

The same applies in respect of the axes of the measuring station 20 and of the gripping station 22—likewise indicated in dot-and-dash lines, which axes define a plane which is vertical relative to the plane defined by the workspindle axes. Due to this convenient arrangement of the spindle support 12 it is possible, by 90° rotations of the spindle support about its indexing axis 14 to enable each of stations 16,18,20 and 22 being brought into that position which is occupied by work spindle 16 in FIGS. 1 and 2, that is to say into the operative position of the work spindles.

The chucks of the work spindles were given reference number 26, whilst 28 is a workpiece engaged in the chuck of the operative workspindle 16 prior to or after machining. The measuring station 20 is equipped with a conventional sensor 30 which on touching an object issues an electrical control signal, and the gripping station 22 carries two double grippers 32,34 to pick up tools.

In the headstock 10 a hollow shaft 36 and a core shaft 38 are rotatably mounted coaxially with the workspindle 16 or 18 which occupies the working position, the coreshaft 38 reaching up to a bracket 40 which is secured to the headstock and on which is mounted a double-acting hydraulic (pressure-medium actuated) cylinder 42. This effects a longitudinal displacement of the coreshaft 38 as will be more particularly described below. Belt pulleys 43 are fixed on the hollow shaft 36 and driving belts 44 run over these pulleys 43 to further pulleys 46 mounted on the output shaft of a driving motor 48 which is capable of driving the hollow shaft 36.

In front of the spindle support 12 there is arranged a compound—or cross-slide consisting of a bottom slide 50 and a top slide 52 and carrying a so-called linear-turret 54. This is equipped with a row of toolshafts 56 and tools 58 carried by the latter so that the tools can be slidingly displaced transversely of the operative workspindle 16 and in the longitudinal direction of the latter. However, corresponding drives for top and bottom slides 52,50 were not shown.

A gantry, or portal 60 is erected above the actual turret lathe and supports a traverse 62 which is displaceable by driving means, not shown, in the direction of the double headed arrow B and along which a travelling carriage 64 can be displaced in the direction of double-headed arrow C by further driving means, likewise not shown. This carriage 64 carries a vertically downwardly extending gripper 66 (see FIG. 1) for the manipulation of tools and workpieces.

Thus, traverse 62, carriage 64 and gripper 66 together represent a manipulation unit generally designated 70, the means for actuation of gripper 66, including rotation, lifting and lowering of this gripper, being not shown because such manipulating systems are familiar to the skilled man.

Figure 1:
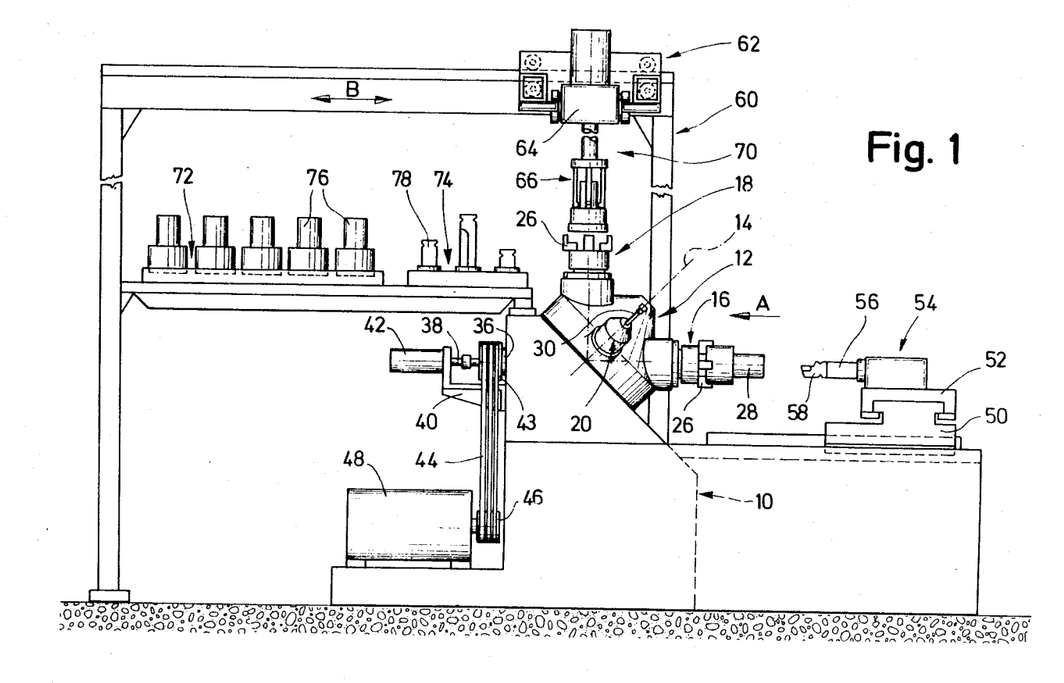
FIG. 1 is a lateral view of a first preferred embodiment of the multispindle-automatic turret lathe according to this invention.
Figure 2:
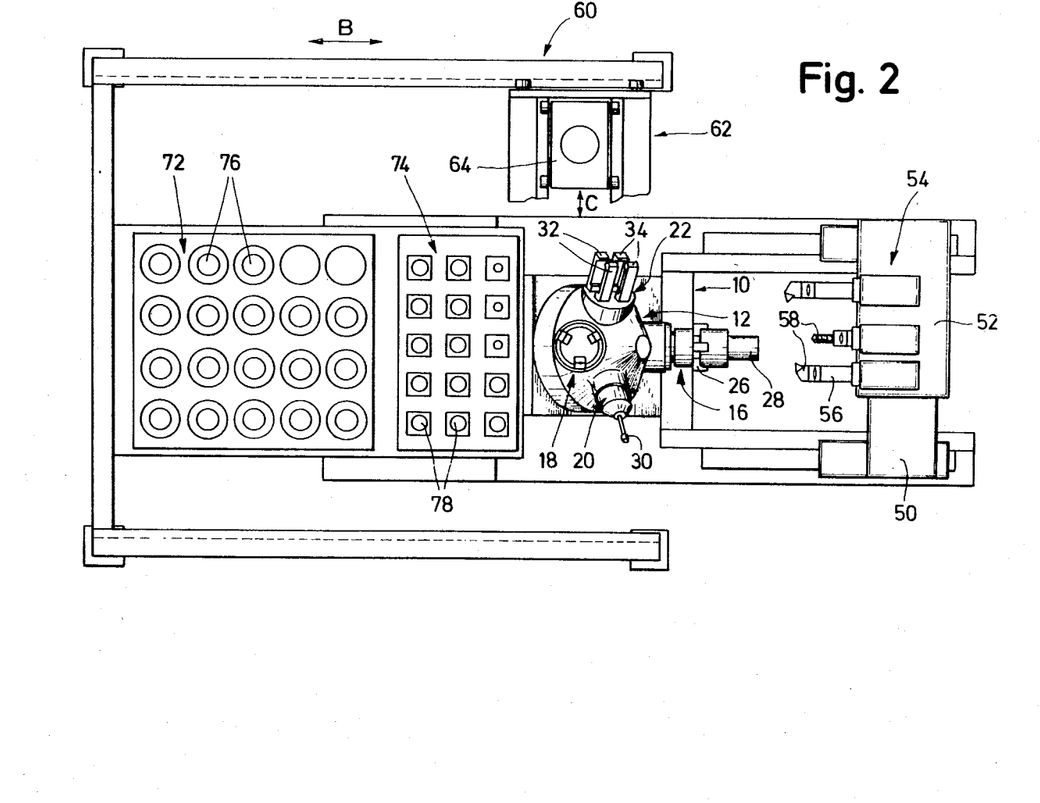
FIG. 2 is a top view of the automatic lathe according to FIG. 1.

Lastly FIGS. 1 and 2 also show a workpiece-pallet 72 and a tool-pallet 74 which are fitted with a range of workpieces 76 and tools 78 respectively. These workpieces and tools can be transported by means of the manipulating unit 70 from the pallets to the spindle support 12 and back from the latter to the pallets.

Figure 3:
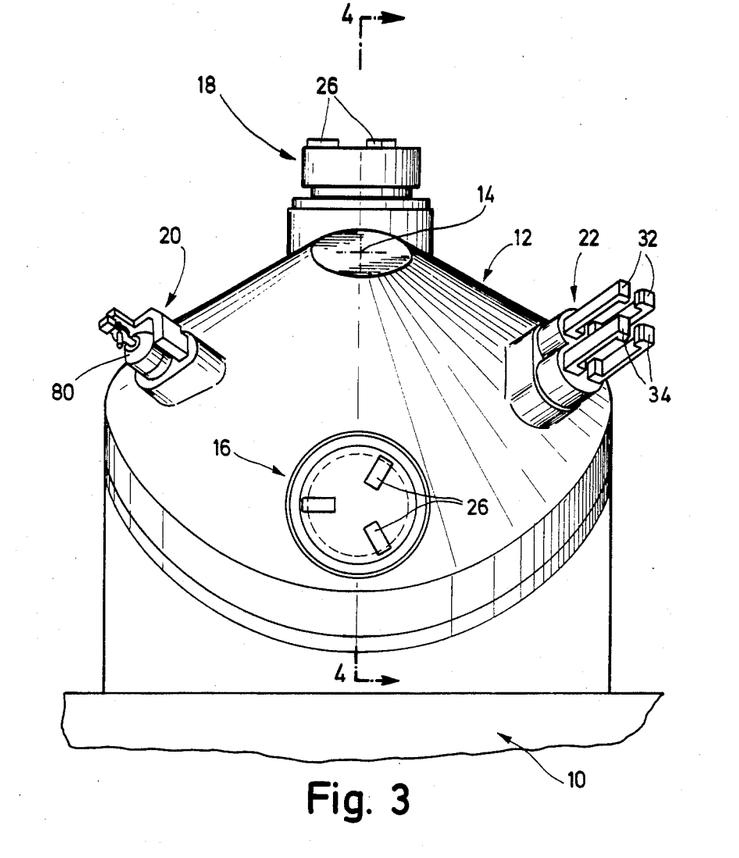
FIG. 3 is a frontal end view of the spindle support of the automatic lathe, viewed in the direction of arrow A in FIG. 1.

FIG. 3 differs from FIGS. 1 and 2 in that the measuring station 20, instead of being provided with a sensor element, is equipped with a calibrating device 80 which will be more particularly described below. Incidentally, FIG. 3 also shows that the axes of all indexing or switching stations, that is to say of the work spindles 16 and 18, of the measuring station 20 and of the gripper station 22, are situated on the peripheral wall of a common cone the generating angle of which is 90° and of which the axis is provided by the indexing or switching axis 14.

The internal arrangement of the spindle support 12, its intermittent, or indexing drive and the drive of the workspindles 16,18 will now be more particularly described with reference to FIGS. 4 and 5.

The hollow shaft 36 which is rotatably mounted in headstock 10 is provided with an adjusting spring 90 which engages in a longitudinal groove 92 formed in the coreshaft 38 which is slidably mounted in hollow shaft 36 so that the two shafts are rotationally rigidly connected but the inner or coreshaft 38 is slidable in the outer hollow shaft 36.

The front end of coreshaft 38 carries one member of a clutch 94, the other clutch member being arranged at the inner end of each work spindle 16,18. By displacing coreshaft 38 to the right hand side as shown in FIG. 4 the workspindle 16, or 18 which occupies the working position can thus be operatively coupled with the coreshaft 38 and driven in rotation by motor 48. However, FIG. 4 shows the parts relatively disengaged in which condition the spindle support 12 is rotatable about the indexing axis 14.

Figure 4:
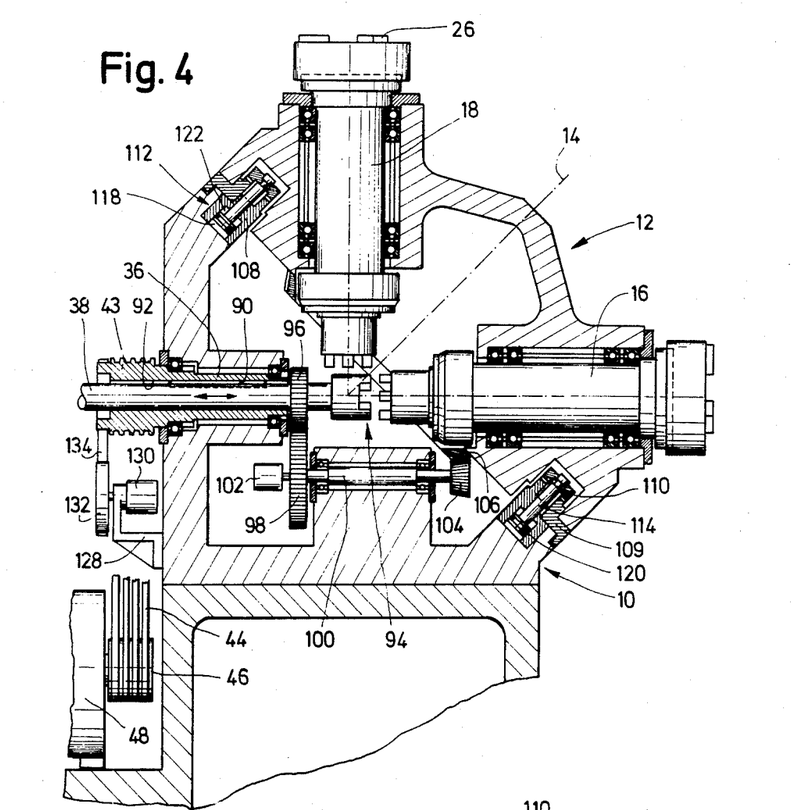
FIG. 4 is a section through the spindle support taken on line 4—4 in FIG. 3.

To this end an output pinion 96 is mounted on coreshaft 38 and in mesh with a driving pinion 98 on a layshaft 100 when coreshaft 38 occupies the retracted, or disengaged position as shown in FIG. 4. The layshaft 100 is further provided with a function generator or synchro 102 and with a bevelgear 104 which latter is in constant mesh with a further bevelgear 106 rigid with the spindle support 12.

The headstock 10 is equipped with a lower ring gear 108 and with a plurality of hydraulic cylinders 112 of which the pistonrods 114 carry an upper ring gear 110. An external ring gear 109 of substantially Z-configuration as viewed in cross section, is fixed on the spindle support 12 and adapted to be connected via upper ring gear 110 with the stationary lower ring gear 108 to prevent rotation.

This connection, or engagement can be released or disengaged by pressure application to a lower cylinder space 118 beneath pistons 120 of the hydraulic cylinders 112 (condition shown in FIG. 4), whilst by pressure application to an upper cylinder space 122 the upper gear ring 110 can be pulled down again and thus enable the spindle support 12 being locked on the headstock 10.

It should further be noted that a further bracket 128 is arranged on the rearside of headstock 10 which bracket 128 supports a synchro- or function generator 130 driven via belt pulley 132 and belt 134 by the belt driving pulleys 43 of hollow shaft 36.

Figure 5:
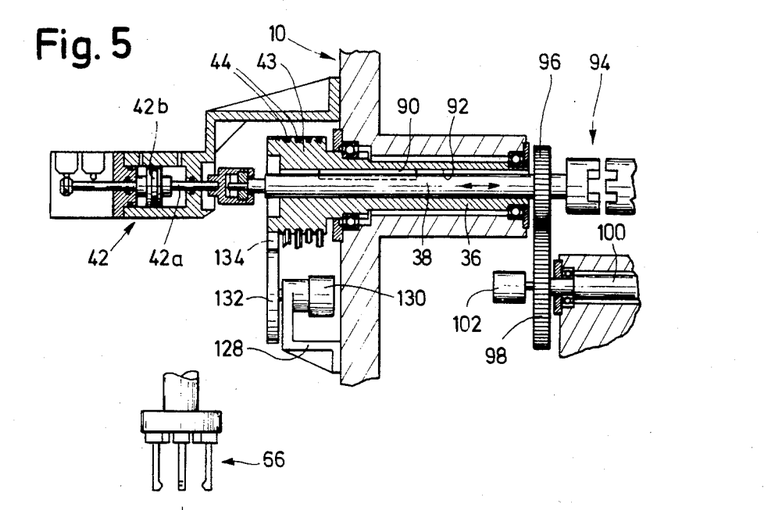
FIG. 5 shows the means for displacing the drive shaft for the workspindles, viewed in section, FIG. 5 complementing FIG. 4 on the left hand side.
Figure 6:
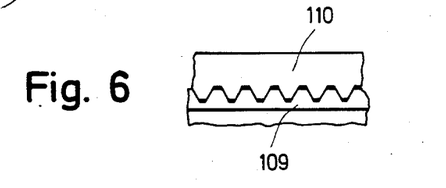
FIG. 6 is a detail from a side view of plane cogging which arrests the spindlehead in its operative positions.
Figure 7:
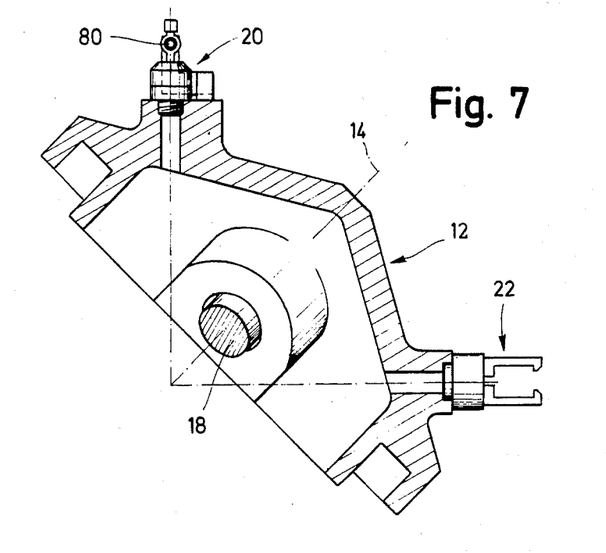
FIG. 7 is a cross section through the spindle support taken along a plane which passes through the spindlesupport-indexing axis and at right angles to the section plane 4—4 in FIG. 3.

FIG. 5 shows the double-acting hydraulic cylinder 42 which comprises a piston rod 42a with piston 42b and on which the coreshaft 38 is rotatably mounted; in the axial direction however, piston rod 42a and coreshaft 38 are mutually connected, as may be noted from FIG. 5.

As already mentioned, the automatic turret lathe according to this invention is to be a numerically controlled lathe; suitable control systems for such machine tools are well known and their particular description may be dispensed with.

In the state of the machine as shown in FIGS. 4 and 5 the spindle support 12 can be rotated with the aid of driving motor 48 about the indexing or switching axis 14, the turning angle being capable of being monitored and fixed with the aid of the function generator 102 and the machine control unit—the function generator 102 is permanently in rigid phase with spindle support 12 owing to the bevel-gear drive 104,106. When the spindle support 12 has been brought into the desired working position it is locked in this position relative to the headstock 10 by means of the cylinders 112 (rams) If one of workspindles 16,18 is in front of coreshaft 38 it may now be displaced to the right hand side as shown in FIG. 4 by rams 42 so that the clutch 94 engages. In order to make sure of mutual engagement of the clutch members the function generator 130 and machine control unit may be used to adjust a specified angular position of the coreshaft 38. On sliding displacement of coreshaft 38 to the right hand side as shown in FIG. 4, that is to say on engagement of clutch 94, the coreshaft 38 will also be disengaged from the bevel gears 104,106 because pinion 96 is pulled out of mesh with pinion 98. Conveniently the transmission ratio between the coreshaft 38 and the bevel gear 106 is chosen such as to ensure that even after rotation of spindle support 12 about axis 14 through 90°, or through a multiple of 90°, the clutch 94 can be re-engaged simply by forward movement of coreshaft 38.

It is evident from FIGS. 1 to 4 that a workpiece engaged by spindle 16 can now be machined while the other workspindle 18 which is not inside the working area of the lathe but extends vertically upwards may be unloaded with the aid of manipulating unit 70, that is to say, a finished workpiece is removed from and a fresh workpiece fitted on the workspindle. With the aid of a slightly modified manipulating unit it would however also be possible during this period to remove a used tool from one of grippers 32,34 and to fit a new tool in the respective other gripper. This could also be done with the aid of manipulator unit 70 shown in FIGS. 1 and 2 provided that the gripper station 22 and the workspindle 18 were mutually exchanged in their position on the spindle support 12.

Figure 8:
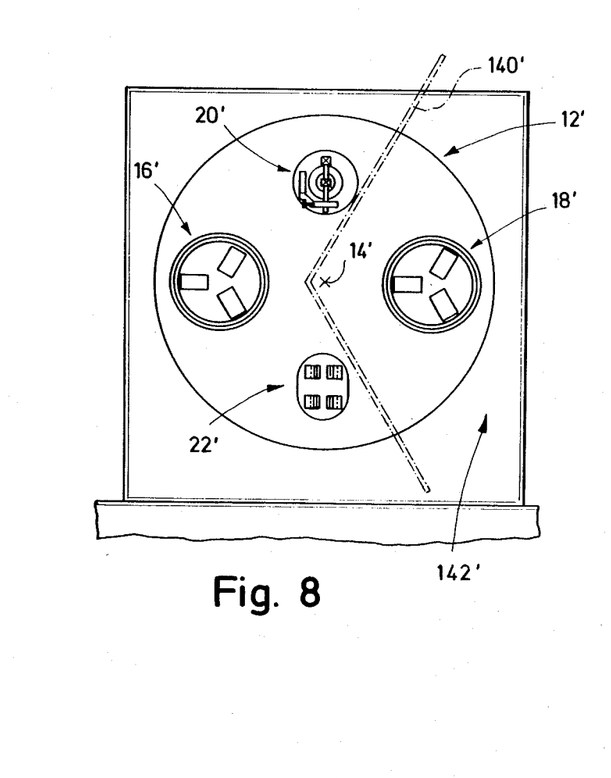
FIG. 8 is a frontal end view of a second embodiment of a spindle support according to the invention.
Figure 9:
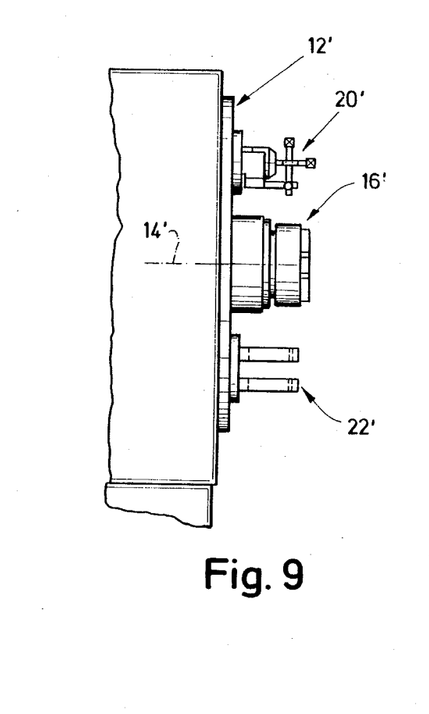
FIG. 9 is a lateral view of the spindle support according to FIG. 8.

The modified spindle support 12' in FIGS. 8 and 9 has a horizontal indexing axis 14' with indexing stations, i.e. workspindles 16',18', measuring station 20' and gripper station 22', of which the axes are all mutually parallel and also parallel to the indexing axis 14'. FIG. 8 shows that the working area or space 142' of the lathe extends behind (on the right, as viewed in FIG. 8) the indexing axis 14' so that a safety partition or guard 140' of the lathe may overlap the workspindle which occupies the working position in customary manner.

FIGS. 8 and 9 could however also represent the spindle support of a so-called vertical lathe in which the operative work spindle extends in the vertical direction; in that case the indexing axis 14' would also be vertically orientated.

Figure 10:
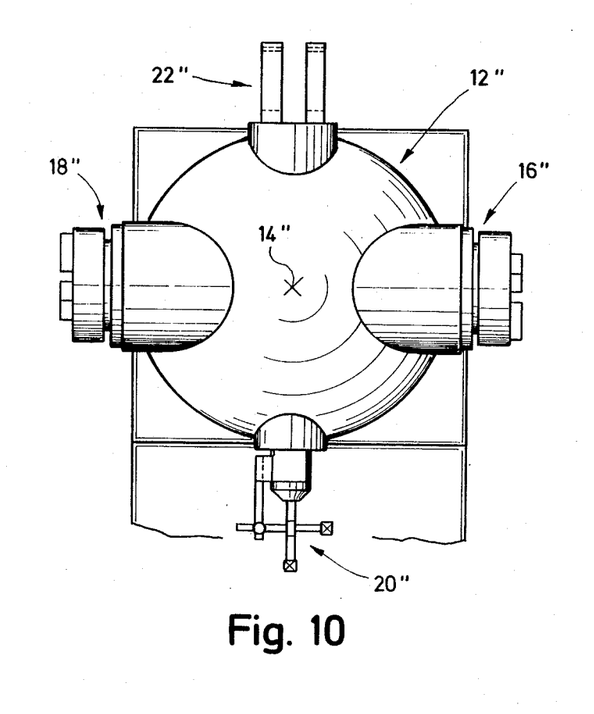
FIG. 10 is a top view, viewing in the vertical direction, of a spindle support with vertical indexing axis.
Figure 11:
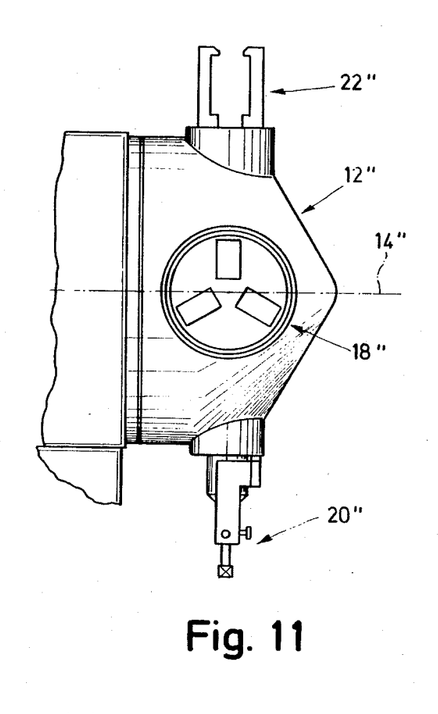
FIG. 11 is a lateral view of the spindle support according to FIG. 10.

In the case of the embodiment according to FIGS. 10 and 11 the indexing axis 14" of a spindle support 12" is assumed to extend vertically whilst the axes of the various indexing or switching stations, namely of the workspindles 16" and 18", of a measuring station 20" and of a gripper station 22", extend horizontally and respectively at right angles, that is to say, as viewed in plan they form a rectangular cross.

However, in this as in all other embodiments of the invention the workspindles define two diagonally opposite switching stations which allow one spindle to be comfortably loaded, or unloaded while a workpiece held by the other spindle is being machined.

The operation of a tool change in an automatic lathe according to this invention will now be more particularly described with reference to FIGS. 12 to 14.

Figures 12, 13:
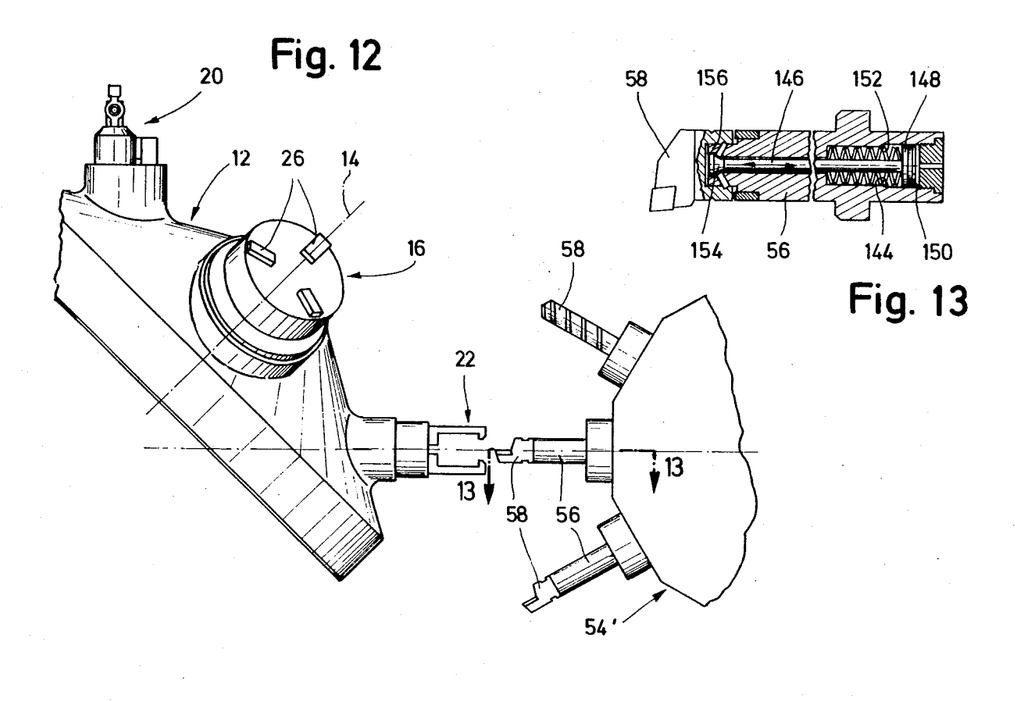
FIG. 12 is a lateral view of the first embodiment acc. to FIGS. 1 to 7 corresponding to the mode of representation in FIG. 1, but showing a conventional star-turret, for illustration of a toolchange operation.
FIG. 13 is a sectional view of the tool which is to be changed, taken on line 13—13 in FIG. 12.

First of all, with reference to FIG. 13, we shall describe the detachable securing of the tools 58 on the toolshafts 56, which is however a known constructional arrangement. The toolshaft receives in a cylinder space 144 a piston 148, which is provided with a piston rod 146 and behind which there is a pressure-medium space 150, the piston being biased by a retaining spring 152 arranged in front of the piston. The piston rod 146 carries a tension cone 154 which co-acts with an internal taper or cone in a split, radially expandable tension chuck 156 of toolshaft 56. The tool 58 is placed on this tension chuck or -head while pressure medium is applied to space 150, whereupon the latter is vented or relieved and the chuck 156 expanded by the effect of retaining spring 152 to retain tool 58 on tool shaft 56.

A tool-change, due either to the end of useful service life of the tool or to a general change-over of the turret tools, may now proceed as follows: The spindle support 12 is turned in such a way that the axis of the gripper station 22 points vertically upwards. In this position the manipulator device 70 introduces a new tool 58 taken from tool pallet 74 into one of the two grippers 32,34 whereupon spindle support 12 is turned in such a way that it pivots the gripper station 22 into the working space of the lathe (conditions as shown in FIGS. 12 and 14).

The star turret 54' is then driven in the direction of the axis of the gripper station 22 so that it will push the worn or otherwise unwanted tool 58 into gripper 32 whereupon this tool is detached from its associated tool shaft 56. The star turret 54' then drives initially in the opposite direction away from gripper station 22, is then driven in the direction of the turret axis in front of gripper 34 and finally advanced towards the latter in such a way that the new tool which is held by gripper 34 is pushed over toolshaft 56. Finally the turret 54' is pulled off gripper 34 whereupon spindle support 12 is rotated through 180° in order that the manipulator device 70 may take the work tool from the gripper station 22 and deposit it on the tool pallet 74. In this position of the gripper station the sensor shown in FIGS. 1 and 2 is within the working space or area of the lathe so that with its aid the position of the cutting edge of the tool newly fitted in turret 54' can be measured and the position of this tool edge can then be fed into the control programme of the automatic lathe; this process occurs preferably during the period in which the manipulating means 70 take the used tool out of spindle support 12 and deposit it on tool pallet 74.

It should be mentioned in this context that gripping mechanism in which tools can be plugged in and which have actuating mechanisms for the subsequent release of such tools are known. For this reason we may dispense with a specific description of the grippers and their actuating mechanisms.

More time-saving and therefore more attractive is the following operational cycle of a tool-change: At the end of cutting-edge life or for re-fitting the turret the empty gripper station 22 is pivoted into the working space of the lathe whereupon the used tool is pushed into gripper 32 by displacing the turret 54'. When the turret has been pulled off the gripper station the spindle support 12 is rotated through 180° so that the gripper station now points vertically upwards. Now the manipulating means 70 come into action to introduce a new tool, which they have picked up in the meantime, into gripper 34, to take on the used tool from gripper 32 and to drop this used tool on tool pallet 74. While this happens gripper station 22 may already be pivoted back into the working space of the lathe whereupon turret 54' takes over the new tool. Immediately afterwards a further, worn-out or otherwise unwanted tool can be introduced from the turret into the gripper station whereupon the spindle support 12 is rotated through 180° in order to move the sensor 30 into the working space area for measuring the newly fitted tool.

Figure 14:
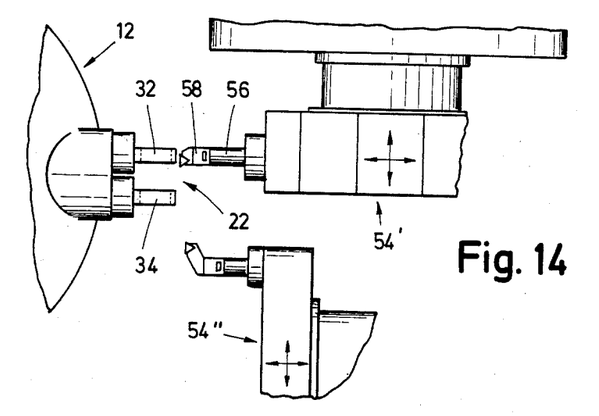
FIG. 14 is a top view in the vertical direction of the spindle support and the two tool-turrets in a 4-axis automatic turret lathe.

A tool change for a four-axis automatic lathe with a second turret 54" as shown in FIG. 14 is executed in analogous manner.

Figure 15:
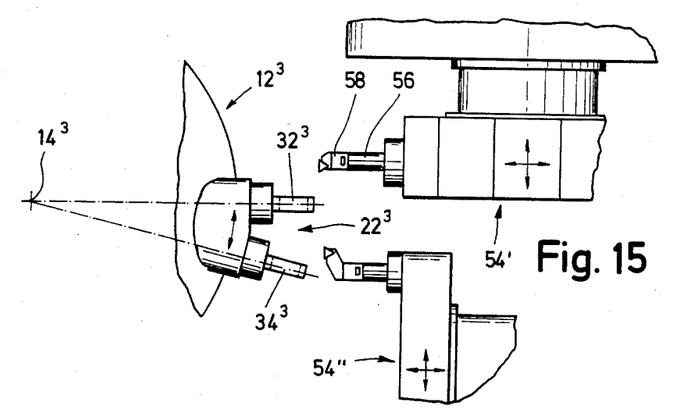
FIG. 15 corresponds to FIG. 14 but with a modified form of execution of the spindle support.

FIG. 15 shows a modification in respect of the embodiment according to FIG. 14 with a spindle support $12^3$ which is provided with a gripper station $22^3$ consisting of two grippers $32^3$ and $34^3$ of which the axes—as indicated in dot-and-dash-lines—extend radially relative to the indexing axis $14^3$ of the spindle support $12^3$. With a four-axes-lathe it is not invariably desirable that both cross slides of both turrets 54' and 54" should be adapted to be displaced over the axis of a work spindle in operative position so that one turret will be fitted with internal machining—and the other turret with external machining tools. In the modified embodiment shown in FIG. 15 the spindle support $12^3$ is rotated for changing tools in turret 54" whilst the tools of turret 54' are changed in the aforedescribed manner.

Figure 16:
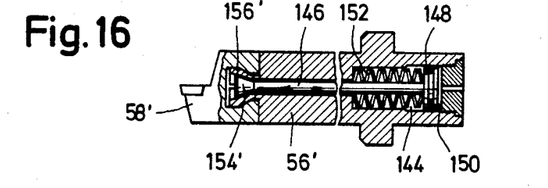
FIG. 16 is a sectional view corresponding to FIG. 13 of a tool, but with different tool-locking means.

The embodiment according to FIG. 15 is particularly well suited for application of the clutch means between toolshaft 56' and tool 58' represented in FIG. 16: these clutch means consist of a dovetailed receiving recess in the tool 58' for engagement with the gripping or chuck head 156' of the tool shaft 56', which latter comprises a chucking wedge 154' instead of the clamping cone 154 shown in FIG. 13. In other words, with this arrangement the tools 58' can be pushed laterally on the tool shafts 56'.

Figure 17:
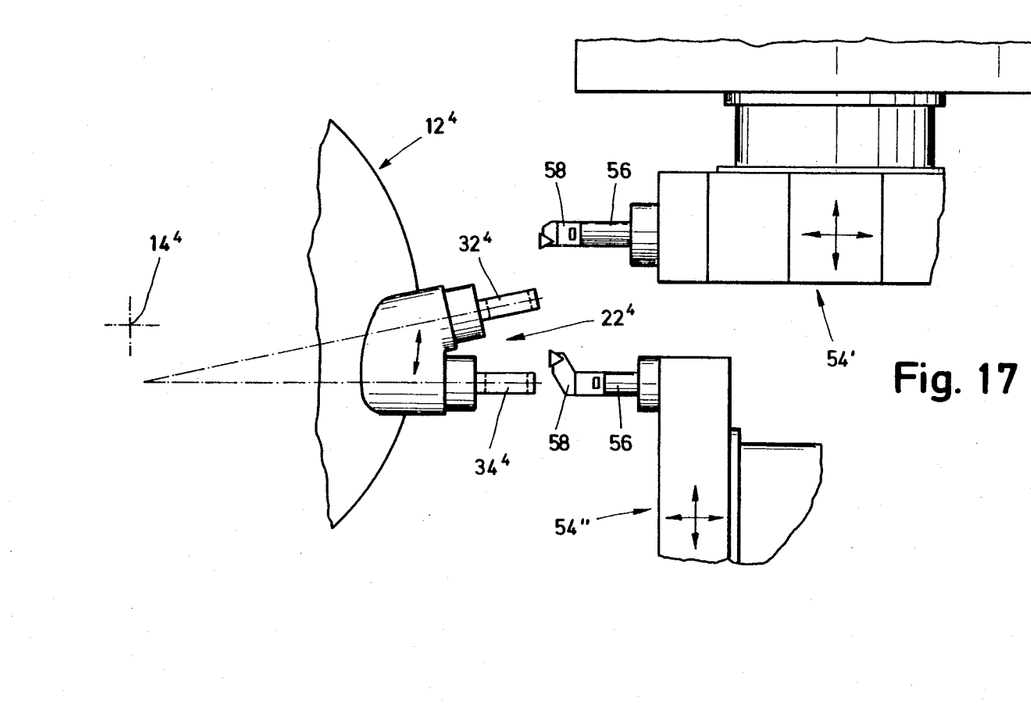
FIG. 17 shows a further variant of the spindle support in corresponding representation to FIGS. 14 and 15.

FIG. 17 shows a further variant of a spindle support $12^4$ with indexing axis $14^4$ and with a gripper station $22^4$ which comprises two grippers $32^4$ and $34^4$. The axes—again indicated in dash-and-dot lines- of these grippers extend tangentially relative to a circle about the indexing axis $14^4$. This embodiment is also particularly well suited for application of the clutch means between tools 58' and tool shafts 56' shown in FIG. 16. Likewise, with the arrangement according to FIG. 17 the spindle support $12^4$ is also rotated about indexing axis $14^4$ for changing the tools of turret 54".

We claim:

1. A multispindle automatic turret lathe comprising a spindle support rotatable as a unit about a central indexing axis, a plurality of work spindles rotatably mounted in said support, each work spindle being mounted in said support for rotation about a separate work spindle axis which is inclined relative to said indexing axis, each work spindle having the same angular position and radial spacing relative to the indexing axis, a further indexing station on said support, a tool position measuring device at said further indexing station, said further indexing station being arranged on the spindle support in like geometrical position to the indexing axis as the work spindles, and tool supporting means at a working location adjacent to said support, said support being indexable to position said work spindles at said location and to position said tool position measuring device at said location to measure the position of a tool in said tool supporting means.

2. Automatic lathe according to claim 1, characterized in that the workspindle-axes intersect the indexing axis.

3. Automatic lathe according to claim 2, characterized in that the included angle between the workspindle-axes and the indexing axis is 45°.

4. Automatic lathe according to claim 1, characterized in that the included angle between two workspindle-axes is 90°.

5. Automatic lathe according to claim 1, characterized in that the relative indexing angle spacing of all indexing stations is identical for all stations.

6. Automatic lathe according to claim 1 characterized in that the included angle between the work-spindle-axis and the indexing axis is 90°.

7. Automatic lathe according to claim 1 characterized in that the tool change station is a measuring station.

8. Automatic lathe according to claim 7 characterised in that the gripper means axis extends radially relative to the indexing axis.

9. Automatic lathe according to claim 7 characterised in that the gripper means axis extends tangentially to a circle around the indexing axis.

10. A multispindle automatic turret lathe comprising a spindle support rotatable about a central axis, a plurality of work spindles rotatably mounted in said support, each work spindle defining an indexing station, each work spindle having the same angular position and radial spacing relative to the indexing axis, a further indexing station on said support, tool gripper means at said further indexing station, said further indexing station being arranged on the spindle support in like geometrical position to the indexing axis as the work spindles, and means at a tool change location adjacent to said support for alternatively manipulating tools relative to said tool gripper means in the course of a tool change operation and manipulating workpieces relative to said work spindles, said support being indexable to position said indexing stations at said tool change location.

11. A multispindle automatic turret lathe comprising a spindle support rotatable about a central axis, a plurality of work spindles rotatably mounted in said support, each work spindle having the same angular position and radial spacing relative to the indexing axis, a first further indexing station on said support, tool gripper means at said first further indexing station, a second further indexing station on said support, a tool position measuring device at said second further indexing station, said further indexing stations being arranged on the spindle support in like geometrical position to the indexing axis as the work spindles, tool supporting means at a working location adjacent to said support, means at a tool change location adjacent to said support for alternatively manipulating tools relative to said tool gripper means in the course of a tool change operation and manipulating workpieces relative to said work spindles, said support being indexable to position said indexing stations at said locations, the arrangement being such that when one of said work spindles is at said working location another work spindle is at said tool change station and when said tool gripper means is at said tool change location, said position measuring device is at said working location.

* * * * *